Aug. 18, 1925.

D. A. SARGENT

TRACTOR SNOWPLOW

Filed Aug. 21, 1923

1,550,573

2 Sheets-Sheet 1

INVENTOR
Don A. Sargent
BY
ATTORNEYS

Aug. 18, 1925.
D. A. SARGENT
TRACTOR SNOWPLOW
Filed Aug. 21, 1923
1,550,573
2 Sheets-Sheet 2
Fig. 3,
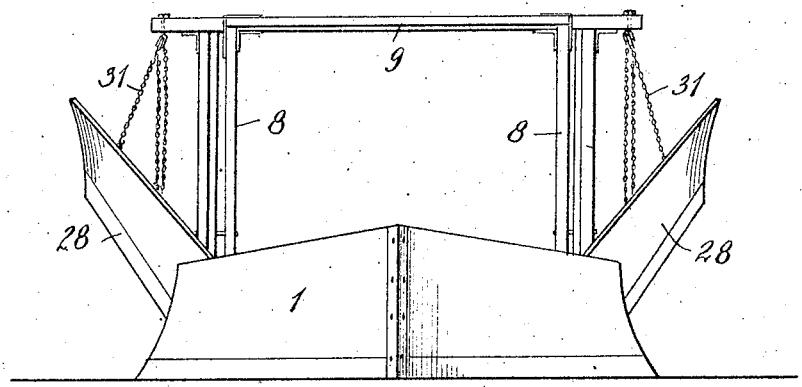
Fig. 4,
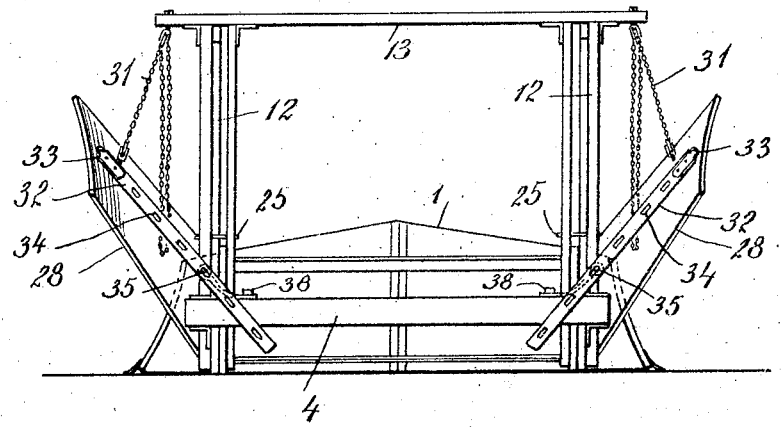

Patented Aug. 18, 1925.

1,550,573

UNITED STATES PATENT OFFICE.

DON A. SARGENT, OF BANGOR, MAINE, ASSIGNOR TO NORTHERN TRAILER COMPANY, OF BANGOR, MAINE, A CORPORATION OF MAINE.

TRACTOR SNOWPLOW.

Application filed August 21, 1923. Serial No. 658,485.

*To all whom it may concern:*

Be it known that I, DON A. SARGENT, a citizen of the United States, residing at Bangor, in the county of Penobscot, State of Maine, have invented certain new and useful Improvements in Tractor Snowplows; and I do hereby declare the following to be a full, clear, and exact description of the invention, such as will enable others skilled in the art to which it appertains to make and use the same.

This invention relates to snow plows, and in particular to plows designed to be drawn by tractors.

In the cities and towns of the North where every winter brings heavy snows, the problem of keeping the streets and roadways clear is vital. In accordance with the present invention, I have designed a snow plow which very satisfactorily solves this problem. My plow is provided with an angular nose to which is secured a rearwardly extending frame supported upon runners and designed to receive a tractor, preferably one of the caterpillar or traction belt type. The draft connection or connections between the tractor and the plow frame are flexible so that the plow, although preceding the tractor is in reality being pulled by it. It is very important that the draft connections be made loose. With rigid connections, the pitching and rolling motion of the tractor is imparted to the plow which not only strains the parts but results in an uneven path. A loose connection obviates these objections and also makes it possible to turn the plow through sidewise pushing or pulling by the tractor applied directly near the forward end of the plow. In order to regulate the depth of the cut made by the plow, I have provided means for inclining the nose at various angles. I have also provided laterally and vertically adjustable wings secured to the frame just behind the nose which supplement the action of the nose, pile the snow, and also upon occasion act as rudders. My plow also possesses many other improved features which contribute to its general effectiveness and which will be pointed out in the following description.

Figure 1:
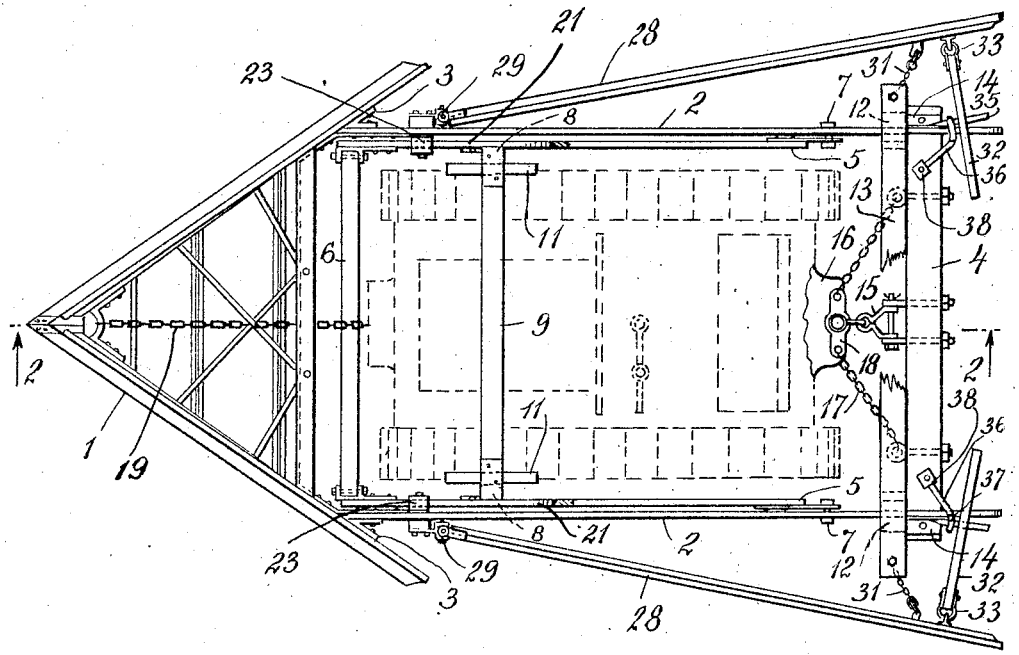
Figure 2:
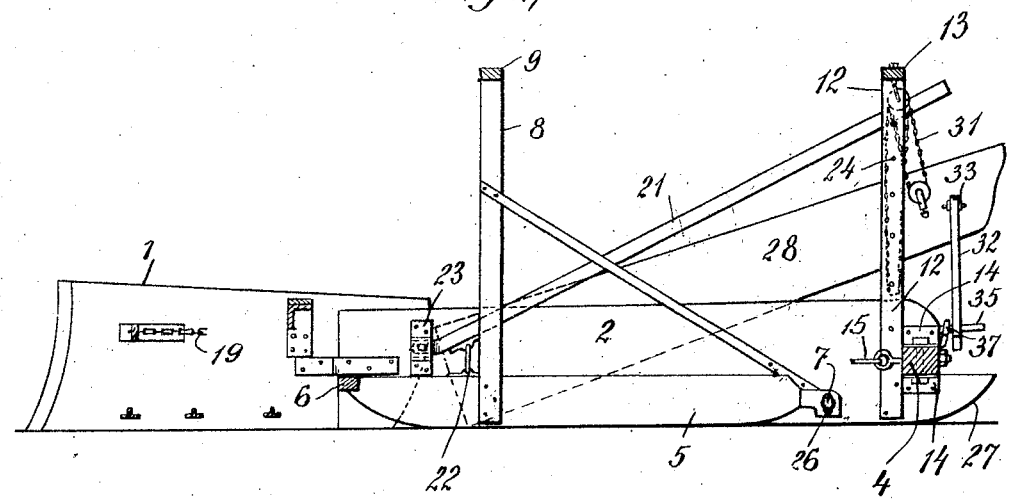

In order that the invention may be more clearly understood, I have illustrated a preferred embodiment of it in the accompanying drawings, in which Fig. 1 is a plan view of the plow shown in operative relation to a tractor; Fig. 2 is a longitudinal, vertical section taken along line 2—2 of Fig. 2, the tractor being removed; Fig. 3 is a front elevation of the plow showing the wings in raised position; and Fig. 4 is a rear elevation of the plow in the position shown in Fig. 3.

The plow, its draft mechanism and various related parts are shown in full lines in Fig. 1, the tractor, except for its tail piece, being shown in dotted lines. The plow is provided with a V-shaped, suitably reenforced nose 1, the sides or shares of which are made concave so that the snow is rolled, not pushed, to the side of the road. Extending rearwardly from this nose, is a frame designed to receive a tractor, comprising side members 2, rigidly secured to the nose by means of angle irons 3. The rear end of the frame is completed by means of a transverse draw bar 4, through which the plow is drawn by the tractor. Within the frame, and designed to support both it and the nose, is a sled comprising two runners 5 connected at their forward ends by means of a cross bar 6. The frame is pivotally connected to the sled at the two points 7. Near the forward end of the runners 5, two uprights 8 arise and are connected overhead by cross bar 9. The inner faces of these uprights are designed to contact with chafing blocks 11 secured to the sides of the tractor as illustrated. Near the rear end of the frame are situated a pair of double uprights 12, which, like the uprights 8, are connected across their upper ends by means of a bar 13. The width of the plow between the runners 5, the length from the cross bar 6 to the draw bar 4, and the height from the cross bars 9 and 13 to the ground are sufficient to permit the entry of a tractor, the plow being, of course, made in various sizes suitable for different size tractors.

I shall now describe in detail the construction of the draw bar and the draft mechanism. The draw bar is held in place between two pairs of angle irons 14, one pair secured to the outer face of each side member 2 near the rear end thereto. A bolt 15 passes through the flanges of these angles and the ends of the draw bar. To reenforce the structure, I have placed these angles adjacent the rear uprights 13, so that in use the pull exerted through the draw bar is transmitted through the frame at the point where it is reenforced by these uprights. As the draw bar must necessarily be removable to permit the entry and exit of the tractor, the bolts 15 may be readily withdrawn to enable the bar to be slid outwardly from between the angle irons 14.

The draw bar is provided at its center with a shackle 15, which makes a loose connection with the tail 16 of the tractor. The tractive power of the tractor is thus applied to the plow and its frame along the center line, and being applied at the rear, the nose is free to ride up and down a sufficient amount to insure easy operation without loss of control. In order to prevent undesirable side play while still retaining the flexibility so important for the successful operation of the plow, the draw bar is provided with two chains 17, which are connected at their forward ends with a draft equalizer 18 pivotally mounted on the tail of the tractor. The draft connection between the tractor and the plow, although permitting ample freedom of motion, is sufficiently rigid to insure proper forward motion of the plow at all times.

The turning of the plow is effected through the forward uprights 8 on the sled and the chafing blocks 11 on the tractor. There is sufficient play between the parts so that when the tractor is operated to turn, say to the right, the right hand chafing block contacts with the right hand uprights 8 and simply pushes the plow around. Should occasion ever arise for backing the plow, I have provided a backing chain 19, which connects the forward end of the nose with the head of the tractor. This chain is of such a length that it is drawn taut before the tractor can back into the draw bar.

The frame is thus connected to the tractor by means of flexible connections so arranged as to permit the utmost freedom of movement, while nevertheless, preventing contact of the rear end and sides of the tractor with the frame. The forward sides of the tractor can, however, come in contact with the frame so that the plow can be turned.

I shall now describe my improved means for varying the angle of inclination of the nose. As stated above, the frame with its attached nose is pivotally mounted upon the sled runners 5 at the points 7. In order to raise the nose of the plow, I have provided a pair of levers 21, one on each side of the frame. These levers are fulcrumed upon the forward ends of the runners 5 by means of links 22, and their forward ends secured to the side members 2 by means of brackets 23. These levers 21 extend rearwardly and pass between the vertical members of each double upright 12. These uprights are provided at suitable intervals with holes 24 through which pins 25 are designed to pass. To tip the nose, the operator bears down upon the rear end of levers 21, and as the leverage is considerable, has no difficulty in causing the frame and the nose to swing upwardly about the points 7. When the desired elevation has been attained, the pins 25 are inserted through the holes 24 in uprights 12 just above the end of the lever. When the nose of the plow swings upwardly, the rear end naturally swings downwardly. The points 7 are, however, spaced only a short distance from the rear of the plow, and therefore the actual downward movement of the rear end would in any event be small. However, in order to avoid this difficulty entirely, I have provided elongated slots 26 in the side members 2 at the point 7, so that even when the nose is in its most elevated position, there is no tendency for the rear ends of the side members 2 to dig into the ground. To this same end, I have rounded off the rear under edges of the side members as indicated at 27.

I shall now describe the construction and operation of the wings, which form an important feature of my plow. As the width of the nose is fixed, the width of the path which can be plowed would also be fixed, were it not for the use of auxiliary wings; and, moreover, the plowed snow would simply pile up in a substantially straight wall along the roadway and might easily fall back again, thus partly covering the already plowed path. In order to overcome these difficulties, I have provided a pair of wings 28, mounted at 29 for universal adjustment upon the side members 2 just behind the ends of the V-shaped nose. These wings extend for substantially the length of the frame, and like the nose, are suitably curved to roll the snow. The outer ends of the wings are supported by means of chain falls 31, the upper blocks of which are secured to the outer ends of the cross bar 13. These chain falls not only support the outer end of the wings, but hold them in any desired angular position, as will be obvious. Lateral adjustment of the wings is effected and maintained through bars 32, loosely pivoted at 33 near the outer ends of the wings. These bars are provided with suitably spaced holes or slots 34 designed to fit over projecting studs 35, which extend from and are integral with the upper angle irons 14 of the pins which hold the draw bar. These bars 32 are made strong enough to resist the snow pressure against the wing. In the case of a comparatively light snow, where a wide path is to be plowed, the wings may be extended laterally in the plane of the nose. In the case of deeper snows, however, such a procedure might not be feasible, and there, by elevating the wings as well as moving them outwardly, it becomes possible to pile the plowed snow in a gently sloping bank along either side of the roadway. Without going into further detail, it will be obvious to those skilled in the art that these wings with their adjustment may be utilized in many ways to handle the snow which has been plowed in the first instance by the nose.

When the plow is being used to widen an already opened road only one side of the nose being in use, the wing on that side, in addition to its action in piling the snow, performs the function of a rudder and holds the nose against the bank. This control is effected by varying the vertical as well as the horizontal angle of the wing.

As the pressure exerted by the wings is considerable, I have found it advantageous to reenforce the studs 35. I have done this, as illustrated, by means of a pin 36 provided at one end with an eye 37 which encircles the stud 35, and at its other end abuts against a bolt head 38. This pin 36 can be held in place upon the cross bar by any desired means, such as a turn button on the bolt head 38, not shown. In removing the draw bar, it is, of course, necessary that the pins 36 be also removed.

The plow, as illustrated, and described, has been found by actual test to function efficiently and well. The tractor is actually drawing the plow, but at the same time it follows in the path cut by the nose of the plow, and thus not only secures better traction for itself but does not pack the snow in advance of the plowing nose. The loose connections with the frame prevent strains and undesirable side-play at the rear of the tractor while enabling the tractor to turn the plow in the most effective manner. By elevating the nose, it becomes possible to regulate the amount of snow left untouched under the plow, and when working in city streets enables the plow to ride over manholes and similar obstructions without danger. The adjustable wings provide means for manipulating the plowed snow in a variety of ways, so that the best results can be obtained in any given instance.

I claim:

1. A snow plow comprising the combination of a nose, and means whereby a tractor situated behind the nose can pull the plow through universally flexible connections made with the tail of the tractor.

2. A snow plow comprising the combination of a nose, a rearwardly extending frame secured thereto and designed to receive a tractor, a draw bar at the rear of the frame, and a shackle bolt on the draw bar for loosely connecting the tail of the tractor with the draw bar.

3. A snow plow comprising the combination of a nose, a rearwardly extending frame secured thereto and designed to receive a tractor, a sled within the frame, and uprights on the sled near the forward end thereof designed to contact with chafing blocks on the sides of the tractor.

4. A snow plow comprising the combination of a nose, a rearwardly extending frame secured thereto and designed to receive a tractor, runners supporting the frame, and uprights near the forward end of the frame designed to contact with chafing blocks on the sides of the tractor.

5. A snow plow comprising the combination of a nose, a frame secured thereto and designed to receive a tractor of the traction belt type, a sled supporting the frame and means within the frame and sled designed to make contact with the tractor at turns.

6. A snow plow comprising the combination of a nose, a rearwardly extending frame secured thereto, and designed to receive a tractor of the traction belt type, a draw bar at the rear of the frame, a flexible draft connection between the draw bar and the tractor, and means near the forward end of the frame designed to make contact with the tractor at turns.

7. A snow plow comprising the combination of a nose, a rearwardly extending frame secured thereto, and designed to receive a tractor, a draw bar at the rear of the frame, a flexible draft connection between the draw bar and the tractor, and means near the forward end of the frame designed to make operative connection with the tractor at turns.

8. A snow plow comprising the combination of a snow removing element, a frame connected thereto designed to receive a tractor, runners supporting the frame, and flexible connections between the frame and the tractor.

9. A snow plow comprising the combination of a snow removing element, a frame connected thereto designed to receive a tractor, runners supporting the frame, and flexible connections between the frame and the tractor, holding the rear end and sides of the tractor out of contact with the frame while permitting contact with the forward sides.

10. A snow plow comprising the combination of a snow removing element, a frame connected thereto designed to receive a tractor, runners supporting the frame, and flexible connections between the frame and the tractor, holding the rear end and sides of the tractor out of contact with the frame while permitting the tractor to turn the plow through power applied near the forward end of the frame.

11. A snow plow comprising the combination of a nose, a rearwardly extending frame secured thereto and designed to receive a tractor, a draw bar at the rear of the frame, a loose connection between the tail of the tractor and the draw bar, and auxiliary chains connecting the tail of the tractor with the draw bar to hold the rear sides of the tractor out of contact with the frame.

12. A snow plow comprising the combination of a nose, a rearwardly extending frame secured thereto and designed to receive a tractor, a draw bar at the rear of the frame, loose draft means for connecting the tail of the tractor with the draw bar, and a backing chain connecting the nose with the front end of the tractor.

13. A snow plow comprising the combination of an angular nose, a rearwardly extending frame secured thereto and designed to receive a tractor, and a wing pivoted adjacent the nose, and adjustable vertically and laterally.

14. A snow plow comprising the combination of a V-shaped nose, a rearwardly extending frame secured thereto and designed to receive a tractor, wings pivoted behind the ends of the nose and adjustable vertically and laterally.

15. A snow plow comprising the combination of a nose, a rearwardly extending frame secured thereto and designed to receive a tractor, wings pivoted adjacent the nose and adjustable vertically and laterally, and means for holding the wings in adjusted position.

16. A snow plow comprising the combination of a V-shaped nose, a rearwardly extending frame secured thereto and designed to receive a tractor, wings pivoted to the frame behind the nose and adjustable vertically and laterally, a bar pivoted near the outer end of each wing and provided with spaced holes, and a pin projecting from the frame on each side thereof and designed to pass through the holes in the bar to hold the wings in adjusted position against the pressure of the snow.

17. A snow plow comprising the combination of a V-shaped nose, a rearwardly extending frame secured thereto and designed to receive a tractor, wings pivoted to the frame behind the nose and adjustable vertically and laterally, a bar pivoted near the outer end of each wing and provided with spaced holes, a pin projecting from the frame on each side thereof and designed to pass through the holes in the bar to hold the wings in adjusted position against the pressure of the snow, and means for reenforcing said pin.

18. A snow plow comprising the combination of a nose, a rearwardly extending frame secured thereto and designed to receive a tractor, a sled for supporting the frame, uprights on said frame and sled, and cross bars connecting the uprights.

19. In a snow plow, a main frame closed at the sides and front, and provided with a removable rear cross-sill, whereby a tractor may be driven in and out of position for coupling to the frame.

20. In a snow-plow, a rigid main frame closed at the sides and front, a removable rear cross-sill, and draft apparatus adapted to connect said sill with a tractor disposed in front thereof.

21. In a snow-plow, a main frame adapted to enclose a tractor at the sides, a derrick rising therefrom, a laterally disposed plow having a forward, pivotal connection with said frame, and hoisting apparatus carried by said derrick and having connection with said plow.

22. In a snow-plow, the combination of a main frame with side and rear sill-members, runners attached to and adapted to carry the frame, plows carried by said frame, and draft apparatus adapted to connect the rear sill with a tractor.

23. A snow plow comprising the combination of a sled, a frame designed to receive a tractor pivotally mounted on the sled for movement in a vertical plane, a nose secured to the frame, means for pivoting the frame upon the sled to raise and lower the nose and vary its angle of inclination, a draw bar at the rear of the plow and a flexible draft connection for connecting the draw bar with the tractor.

24. A snow plow comprising the combination of a sled, a frame designed to receive a tractor pivotally mounted near the rear end of the sled for movement in a vertical plane, a nose secured to the frame, a lever on either side of the plow for pivoting the frame upon the sled to raise and lower the nose and vary its angle of inclination fulcrumed near the forward end of the sled and connected to the frame, a draw bar at the rear of the frame, and a flexible draft connection for connecting the draw bar with the tail of the tractor.

In testimony whereof I affix my signature.

DON A. SARGENT.